Sept. 13, 1966   J. P. SCHOMMER   3,272,180
ANIMAL FEED PROPORTIONING AND MIXING APPARATUS
Filed April 29, 1964   3 Sheets-Sheet 1

INVENTOR.
JULE P. SCHOMMER
BY
Kane, Dalsimer and Kane
ATTORNEYS

Sept. 13, 1966      J. P. SCHOMMER      3,272,180

ANIMAL FEED PROPORTIONING AND MIXING APPARATUS

Filed April 29, 1964      3 Sheets-Sheet 2

INVENTOR.
JULE P. SCHOMMER
BY
Kane, Dalsimer and Kane
ATTORNEYS

Sept. 13, 1966  J. P. SCHOMMER  3,272,180
ANIMAL FEED PROPORTIONING AND MIXING APPARATUS
Filed April 29, 1964  3 Sheets-Sheet 3

INVENTOR.
JULE P. SCHOMMER
BY
Kane, Dalsimer and Kane
ATTORNEYS

United States Patent Office 3,272,180
Patented Sept. 13, 1966

3,272,180
ANIMAL FEED PROPORTIONING AND MIXING APPARATUS
Jule P. Schommer, West De Pere, Wis., assignor to H. D. Hudson Manufacturing Company, Chicago, Ill., a corporation of Minnesota
Filed Apr. 29, 1964, Ser. No. 363,475
6 Claims. (Cl. 119—52)

This invention relates generally to an improved feeding apparatus and, more particularly, to feeding apparatus for cattle, livestock and the like; although it should be understood that the invention may apply equally as well to other types of feed material and purposes other than that suggested for cattle feeding.

Cattle are generally fed by means of a bunk structure which may be described as an elevated trough at a height conveniently accessible to cattle or livestock or the particular animals being fed. These bunks are supplied with the selected feed and, in the case of cattle, perhaps a mixture of corn silage (shredded corn stalks) and corn. A common manner of feeding this mixture is by means of an auger mechanism. This mechanism would include an elongated trough located above the bunk and adapted to receive the mixture fed by an auger. When this trough contains the desired amount of feed, the auger will stop and the trough will then be tipped to deposit the mixture into the bunk. In arriving at the desired mixture, the proportion of corn to silage was roughly determined. This approximation was conducted by visual means in most instances by either manually or mechanically introducing the corn into the path of travel of the silage. In this connection, above a certain point, the amount of corn fed a steer will have no beneficial value. Therefore, from a cost aspect as well as pure economics, it would be advantageous to be able to meter the amount of corn introduced into the corn silage. It is in connection with this advantage that one aspect of the present invention is directed thereby eliminating any approximation and guesswork.

It is, therefore, a principal object of this invention to accurately measure, meter and discharge in one operation, an ingredient of feed, particularly high moisture corn for cattle feeding.

A further object is to provide means for discharging into a transport conveyor a measured amount of feed or other material and, more particularly, high moisture corn into corn silage for feeding cattle.

A still further object is to incorporate a metering means for corn directly to the silo unloader into a self-contained hopper of the metering means.

Another object is to provide cattle feeding apparatus in which each steer will be afforded an equal ration of feed, an accomplishment somewhat difficult to realize or appreciate in the past.

An animal feeding unit incorporating the teachings of this invention will include a metering device adapted to discharge onto a moving conveyor a metered amount of an ingredient or additive of the animal feed. In connection with the feeding of cattle, this metering device is peculiarly adapted to handle high moisture corn and lead it at a predetermined rate into corn silage being transferred to a cattle feeding bunk. Thus, a combined silage feed and corn metering device is coupled with a cattle feeding bunk in accordance with this invention. This feeding bunk takes advantage of idler assemblies coupled with a chain from which extends a series of flights or pushers. One of these assemblies is coupled directly to a motor drive and reduction gear system. Accordingly, as the metered amount of silage and corn is deposited in the bunk, the angle irons will push this deposited mixture from one end of the bunk to the other and back again. With this arrangement, each steer will be afforded an equal ration of feed, with each ration disposed between adjacent flights.

Other objects and advantages will become apparent from the following detailed description which is to be taken in connection with the accompanying drawings illustrating a somewhat preferred embodiment of the invention and in which:

FIG. 1 is a perspective view of a proportioning system incorporated in a cattle feed of corn and silage from separate silos, all of which are adapted to be enclosed within a shed with the discharge end of the main conveyor adapted to deposit the corn-silage mixture at the leading end of a bunk incorporating a motorized flight conveyor for conveying the deposited mixture evenly throughout the bunk in order to provide cattle with equal food rations;

FIG. 3 is an enlarged perspective view of the feed selector control for controlling the operation of the metering device in accordance with the formulation dictated for the size of cattle being fed thereby avoiding the possibility of human error;

Figure 1:
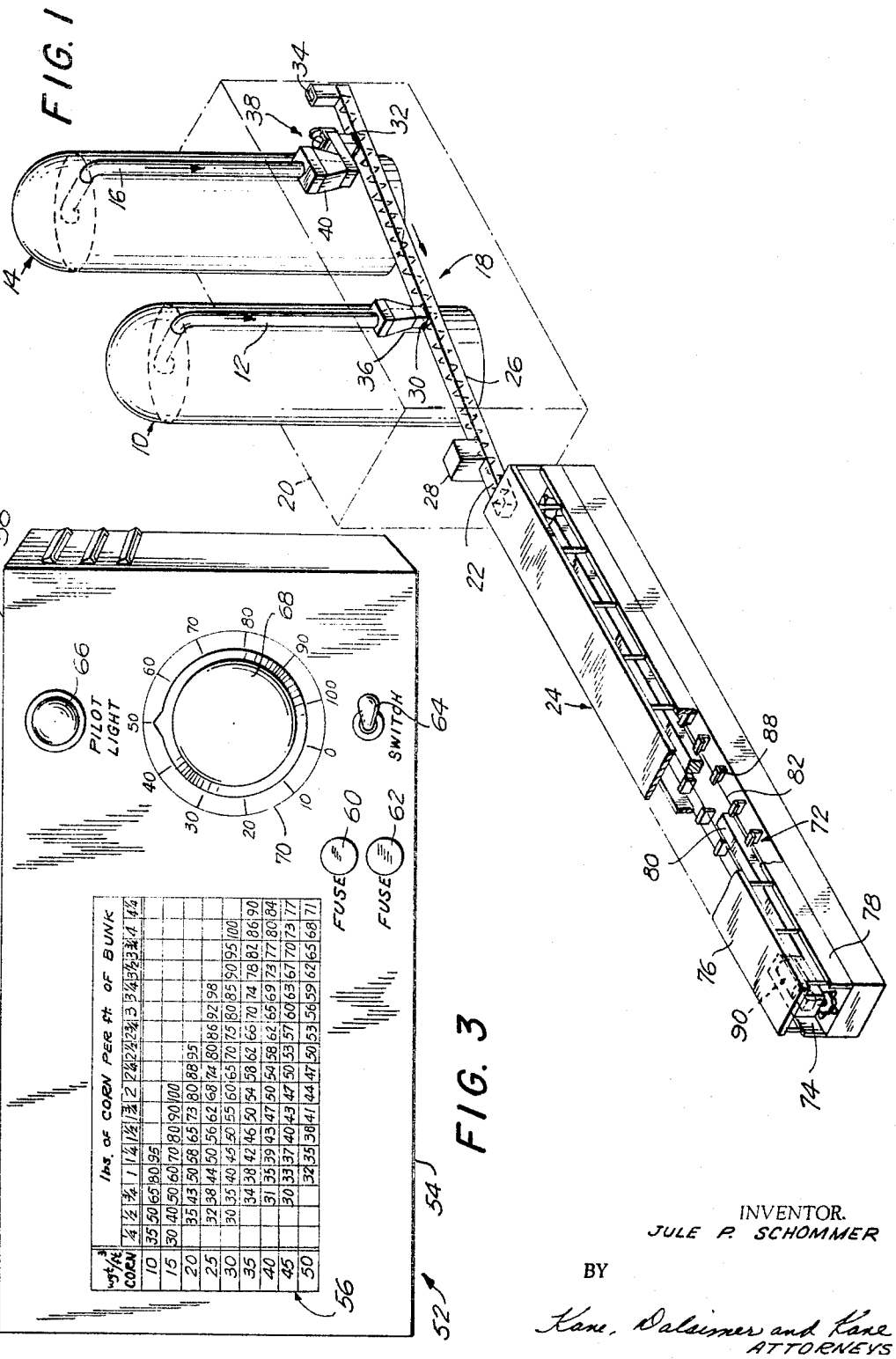
Figures 2, 6:
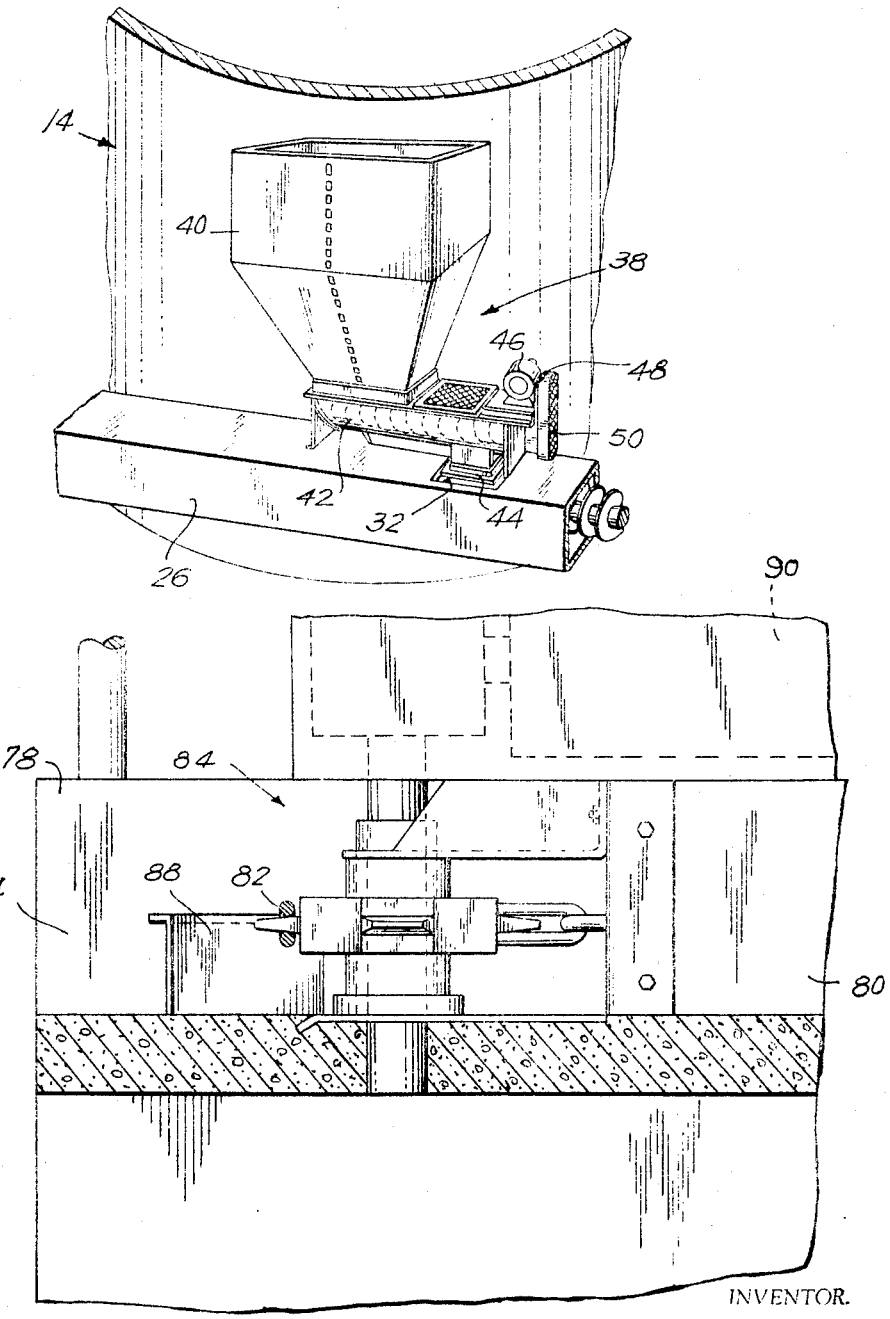
FIG. 2 is an enlarged fragmentary perspective view of the metering device and associated structure for feeding high moisture corn of this embodiment.
FIG. 6 is an enlarged fragmentary view partly in section showing the idler assembly of the flight conveyor.
Figure 4:
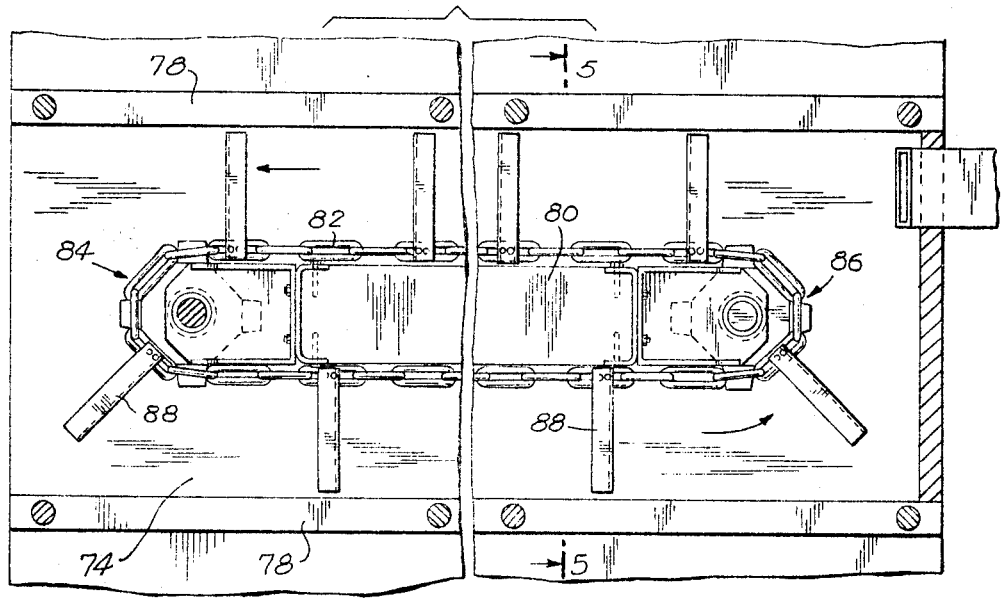
FIG. 4 is a top plan view of the feed bunk with the roof therefor removed.
Figure 5:
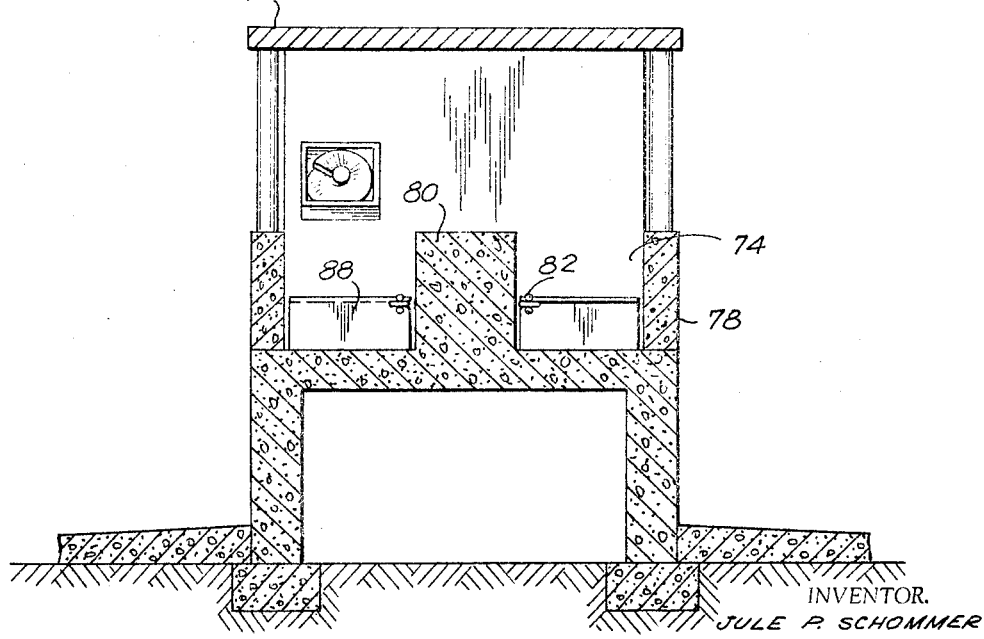
FIG. 5 is a sectional view taken along the line 5—5 of FIG. 4.

In accordance with the illustrated embodiment, corn and corn silage is employed in the feeding of cattle. Naturally, other types of feed and material may be handled or manipulated; and other purposes are contemplated other than cattle feeding. Thus, the illustrated embodiment is associated with a first silo 10 of the conventional type for containing corn silage. Corn silage is essentially the shredded stalks of the corn plant. As is customarily the case, a chute 12 leading from the top of the silo is adapted to remove its contents.

A second silo 14 containing high moisture corn again is emptied from the top through the chute 16. The discharge material enters a proportioning unit 18 which may be conveniently housed in a shed 20. This proportioning unit 18 is adapted to receive the discharge silage and corn and mix them in accordance with a predetermined formulation. The mixture is then discharged exteriorly of the shed at its discharge end 22 into the leading end of a cattle feed bunk 24 for distribution.

The proportioning unit 18 includes a main conveyor 26 of the auger type driven by the drive means 28 which may entail the usual motor and reduction gear network for purposes of driving the auger at the desired rate of travel. In the specific embodiment, the auger is provided with a pair of inlets 30 and 32 for the silage and corn, respectively. Another auger lead-in or auxiliary inlet port 34 may also be provided for the conveyor 26 to permit the introduction of other ingredients to be fed cattle such as crushed apples for their food value.

A receiving hopper 36 is adapted to deposit its contents that it receives through the chute 12 into the inlet 30. This hopper 36 may assume the form of somewhat conventional construction by being adapted to be pivotal to a substantially horizontal plane at which access may be had to the inlet 30.

Interposed between the inlet opening 32 and high moisture corn discharge chute 16 is a metering device 38 which is adapted to feed the corn at a certain rate. Of course, this will depend upon the rate at which the silage is being fed in order to attain the preselected mixture of feed. Thus, the high moisture corn or other silage from a silo is discharged through the feeding chute 16 by means of the usual silo unloader into a receiving hopper 40 of the metering device. This corn is then deposited into the inlet end of an auger 42 to be ultimately discharged through the discharge opening 44 of the auger. The auger 42 is activated at a predetermined speed by a drive which includes a motor 46 and a reduction gear network 48 through a chain or belt drive 50.

The speed of the auger 42 is regulated by means of a control of the conventional electrical type or, preferably, may assume the form of that illustrated in FIG. 3. This control unit 52 consists of a housing 54 bearing a feed selector chart 56. The exterior of the housing 58 may include a pair of fuses 60 and 62, an on-off switch 64, a pilot light 66 and a speed control knob 68 having an indicator together with a speed indication scale 70. Although not shown, the control may be suitably coupled electrically to a house line by first connecting this line across the primary of a variable transformer which is variable by means of the rotation of the knob 68. The secondary of this transformer is then coupled electrically to selenium rectifiers, the output of which is applied to the motor 46. The circuitry involved for the control box is readily obvious to those skilled in the art and does not necessarily constitute this invention and, accordingly, need not be explored at any greater length.

The operating procedure in employing the control 52 is to first determine the weight per cubic foot of the material to be metered. This value is then applied to the feed selector chart 56 which is scaled vertically in accordance with the weights per cubic foot of the material in a horizontal direction to the number of pounds of corn per foot of feeding bunk. The feed control knob 68, graduated from 0 to 100, or, for that matter, any range of values depending upon the particular application, is set to the pounds of material desired per foot of feeding bunk by finding the dial setting on the chart 56. When the dial 68 is set, the switch 64 is placed in the ON position and the electrical circuit will be completed to start the motor 46. The auger 42 will now be actuated and revolved to thereby discharge the high moisture corn through the discharge opening 44 into the auger conveyor 26 through its inlet opening 32.

Of course, prior to the operation of the metering device 38, the hopper 40 is initially filled by means of the silo unloader to the desired level as viewed through the transparent openings provided therein.

The regulated mixture is discharged at the discharge end 22 of the proportioning unit 18 into the feeding bunk 24 which serves to disperse this mixture evenly throughout the bunk through the operation of a flight conveyor 72 to afford equal rations between the flights for each cattle. The bunk 24 includes an elevated trough 74 accessible to the cattle. A roof structure 76 provides shelter for this trough and material contained therein. The side walls of the trough 74 may be defined by lining planks or concrete slabs 78. Naturally, the length of the trough is a variable depending upon the number of cattle and livestock to be serviced.

A central partition 80 extends longitudinally throughout the length of the trough and about which a flight conveyor 72 is adapted to travel. This flight conveyor 72 is in the form of an endless chain 82 disposed around the partition 80 and engaged at each of its ends with essentially identical idler sprocket assemblies 84 and 86. A plurality of flights or paddles 88 are secured to the chain 82 at spaced intervals. Each one of the conveyor flights 88 may be formed of angle iron stock which the front face of the vertical leg of the angle iron being foremost in the direction of travel of the conveyor as indicated by the arrow.

The idler assemblies 84 and 86 may assume the form and construction of that disclosed in companion patent application entitled, "Gutter Cleaner," and having common inventorship and assignee, filed April 13, 1964, and bearing Serial Number 358,993. Therefore, reference should be made to that application for details of these assemblies. The sprocket assembly 84 may be coupled with a motor drive embracing a drive motor 90 and reduction gear network for driving the flight conveyor at a predetermined rate.

Thus, it has been found that, upon actuation of the flight conveyor 72 following the start of discharge of the regulated feed mixture from the discharge end 22 of the proportioning unit 18, the mixture will be conveyed around and throughout the trough 74 of the bunk 24. As a result of the particular arrangement of bunk and component parts thereof, equal rations will be contained between adjacent flights. This is attained upon one complete traversal of trough of the flight conveyor. The speed of the flight conveyor 72 is selected such that it will complete one turn following the start of the operation of the proportioning unit 18 and its stoppage. Thus, each cattle will be given the same ration assuming the number of cattle is equal to the number of rations so produced. Naturally, if the desired number of rations is less, the flight conveyor 72 will be actuated to complete a partial rotational cycle and the proportioning system only actuated for a corresponding period of time.

Accordingly, with this invention, the art will now provide cattle with an accurate amount of corn per animal per day without guesswork required. The cattle will obtain full and balanced rations thereby obtaining substantially uniform and the desired amount of growth in the fattening process. There will be substantially no crowding of cattle at any particular location along the bunk because there will be an equal ration between each flight pair. Of importance is the fact that in the bunk arrangement of this invention, the cattle do not start feeding until such time as the flight conveyor stops thereby providing another assurance against crowding. In addition, with the present invention, no more than approximately 24 minutes per day need be expended for the purposes of feeding cattle. The process being essentially automatic, eliminates the requirement for personnel other than those required to operate the controls which, under ideal conditions, need only be a single individual.

In accordance with acceptable practice, a five hundred pound steer is ordinarily fattened to about 1100 lbs. in approximately 300 days. Ordinarily one percent of body weights of the cattle determines its ration per day of corn. Thus, for a 500-lb. steer, 25 lbs. of silage and 5 lbs. of corn are fed it per day. Thus, the high carbohydrate value of corn is assured each steer by this invention with overfeeding of corn substantially eliminated and waste reduced to a minimum.

Thus, among others, the several aforenoted objects and advantages are most effectively attained. Although a single somewhat preferred embodiment of this invention has been disclosed in detail, it should be understood that the invention is in no sense limited thereby and is to be taken according to the scope of the appended claims.

I claim:

1. Animal feeding apparatus comprising in combination, a first source of a first substance to be fed, a second source of a second substance to be fed, said sources constituting silos and the lower part of said silos being disposed in an enclosure; a proportioning unit also in said enclosure coupled with said sources for regulating the mixture of said substances according to a pre-set proportion and transferring the mixture to a point of discharge, and including a primary conveyor having a first inlet for receiving a first substance and having a second inlet, drive means for driving the primary conveyor at a preset rate of travel, an auxiliary conveyor disposed to receive a second substance and transfer it to the second inlet of the primary conveyor, a second drive means for driving the auxiliary conveyor at a preset rate of travel, said auxiliary conveyor including an auger, and control means for regulating the rate of travel of the auger relative to the primary conveyor in accordance with the amount of the second substance to be fed; a feeding bunk for receiving the discharged mixture of said substances, and means for distributing the discharge mixture in the bunk.

2. The invention in accordance with claim 1 wherein the primary conveyor is an auger and wherein the animals to be fed are cattle and said first material is corn silage and said second material is high moisture corn.

3. The invention in accordance with claim 1 wherein said second drive means including a motor and gear reduction for the motor output.

4. The invention in accordance with claim 3 wherein said primary conveyor includes an auger and the first drive means is a variable speed motor.

5. The invention in accordance with claim 1 wherein the bunk distributing means comprises a flight conveyor including a pair of spaced idler sprocket wheel assemblies and a chain having laterally extending spaced flights operatively connected to the idler sprocket wheel assemblies, and drive means for moving the assemblies and, consequently, the chain and flights extending therefrom.

6. The invention in accordance with claim 5 wherein said feeding bunk includes an elevated trough having a central longitudinally extending partition with said assemblies being disposed in the trough one at each end of the partition and the chain surrounds the partition and the flights travel in said trough to move the mixture.

References Cited by the Examiner
UNITED STATES PATENTS

| | | | |
|---|---|---|---|
| 2,970,532 | 2/1961 | Skelton | 222—134 X |
| 2,970,568 | 2/1961 | Johnson | 119—52 |
| 2,973,120 | 2/1961 | Stevenson et al. | 222—134 |
| 2,981,402 | 4/1961 | Cleaveland | 119—52 X |
| 3,037,671 | 6/1962 | Cochran | 222—134 X |
| 3,125,991 | 3/1964 | Van Dusen | 119—56 |
| 3,171,385 | 3/1965 | Decker et al. | 119—51.11 |
| 3,174,651 | 3/1965 | Strite | 222—134 X |
| 3,176,878 | 4/1965 | Hobgood | 222—134 |
| 3,184,108 | 5/1965 | Grau | 222—134 X |

OTHER REFERENCES (A) Successful Farming, vol. 52, March 1964, p. 63.
(B) Successful Farming, vol. 60, December 1962, p. 35.

SAMUEL KOREN, *Primary Examiner.*

JOE O. BOLT, ALDRICH F. MEDBERY, *Examiners.*